United States Patent
Hegde et al.

(10) Patent No.: US 12,453,893 B1
(45) Date of Patent: Oct. 28, 2025

(54) UNSUPERVISED TRAINING OF AN ACTIVITY CLASSIFIER

(71) Applicant: Amazon Technologies, Inc., Seattle, WA (US)

(72) Inventors: Chaitra Hegde, Kirkland, WA (US); Gezheng Wen, Bellevue, WA (US); Layne Christopher Price, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 421 days.

(21) Appl. No.: 18/060,938

(22) Filed: Dec. 1, 2022

(51) Int. Cl.
*A63B 24/00* (2006.01)
*G06F 18/24* (2023.01)
*G06N 3/02* (2006.01)
*A61B 5/00* (2006.01)
*G06F 18/214* (2023.01)

(52) U.S. Cl.
CPC .......... *A63B 24/0003* (2013.01); *G06F 18/24* (2023.01); *G06N 3/02* (2013.01); *A61B 5/7264* (2013.01); *A63B 2024/0071* (2013.01); *G06F 18/2155* (2023.01)

(58) Field of Classification Search
USPC ......................................................... 702/127
See application file for complete search history.

(56) References Cited

U.S. PATENT DOCUMENTS

| | | | |
|---|---|---|---|
| 2010/0112996 A1* | 5/2010 | Ho | H04W 16/28 455/419 |
| 2021/0097694 A1* | 4/2021 | Yang | G06T 7/20 |
| 2021/0162261 A1* | 6/2021 | Neumann | G06F 18/23213 |
| 2022/0051145 A1* | 2/2022 | Zhang | G06N 20/10 |
| 2022/0198368 A1* | 6/2022 | May | A63B 24/0003 |
| 2022/0249906 A1* | 8/2022 | Phillips | A61B 5/681 |
| 2022/0277232 A1* | 9/2022 | Jones | G06N 3/08 |

OTHER PUBLICATIONS

Banos, O., et al., "mHealthDroid: A Novel Framework for Agile Development of Mobile Health Applications," In International Workshop on Ambient Assisted Living. Springer, 2014, pp. 91-98.

(Continued)

*Primary Examiner* — Paul D Lee
(74) *Attorney, Agent, or Firm* — Athorus, PLLC

(57) ABSTRACT

Disclosed are systems, methods, and apparatus for unsupervised training of an activity classifier for movement measured at a target location of a user using a trained source activity classifier configured to determine an activity based on motion measured at a source location of a user. According to exemplary embodiments, the activity classifier for the target location can be trained using source embeddings generated by a trained classifier for the source location. For example, the source embeddings and the motion measured at the target location may then be provided as training inputs to the target activity classifier for the target location of a user, so that the target activity classifier can reconstruct the source embedding for the target motion without the use of any labeled training data and/or without having to learn the transfer function of the existing trained machine learning model.

20 Claims, 8 Drawing Sheets

(56) References Cited

OTHER PUBLICATIONS

Chen, C., et al., "Motion Transformer: Transferring Neural Inertial Tracking Between Domains," (2019) In Proceedings of the AAAI Conference on Artificial Intelligence, vol. 33, No. 01, 2019, pp. 8009-8016. Association for the Advancement of Artificial Intelligence (www.aaai.org).

Chen, Y., et al., "Cross-position Activity Recognition with Stratified Transfer Learning," Pervasive and Mobile Computing, vol. 57, pp. 1-13, 2019.

Faridee, A.Z.M., et al., "STranGAN: Adversarially-learnt Spatial Transformer for Scalable Human Activity Recognition," (2022) Smart Health, vol. 23, p. 1-17. Research Collection School of Computing and Information Systems.

Ganin, Y., et al., "Domain-Adversarial Training of Neural Networks," Journal of Machine Learning Research, vol. 17, No. 1, Jan. 2016. pp. 2096-2030.

Kumar, A., et al., "Fine-Tuning can Distort Pretrained Features and Underperform Out-of-Distribution," International Conference on Learning Representations, 2022. 42 pages. URL: https://openreview.net/forum?id=UYneFzXSJWh.

Li, J., et al., "Transfer Learning Improves Accelerometer-Based Child Activity Recognition via Subject-Independent Adult-Domain Adaption," IEEE Journal of Biomedical and Health Informatics, vol. 26, No. 5, pp. 2086-2095, 2022.

Mu, F., et al., "Unsupervised Domain Adaptation for Position-Independent IMU Based Gait Analysis," In 2020 IEEE Sensors Conference, pp. 1-4.

Ordóñez-Morales, F.J. and D. Roggen, "Deep Convolutional and LSTM Recurrent Neural Networks for Multimodal Wearable Activity Recognition," Sensors, vol. 16, No. 1, 115, pp. 1-25, 2016.

Ordóñez-Morales, F.J. and D. Roggen, "Deep Convolutional Feature Transfer Across Mobile Activity Recognition Domains, Sensor Modalities and Locations," In Proceedings of the 2016 ACM International Symposium on Wearable Computers, ser. ISWC '16. Association for Computing Machinery, 2016, p. 92-99. URL: https://doi.org/10.1145/2971763.2971764.

Pei, Z., et al. "Multi-Adversarial Domain Adaptation." In Thirty-Second AAAI Conference on Artificial Intelligence (2018) Apr. 29, 2018, 8 pages.

Reiss, A. and D. Stricker, "Introducing a New Benchmarked Dataset for Activity Monitoring," in 2012 16th international Symposium on Wearable Computers. IEEE, 2012, pp. 108-109.

Roggen, D., et al., "Collecting Complex Activity Datasets in Highly Rich Networked Sensor Environments," In 2010 Seventh international Conference on Networked Sensing Systems (INSS). IEEE, 2010, pp. 233-240.

Wang, J., et al., "Deep Transfer Learning for Cross-domain Activity Recognition," ICCSE 2018: Proceedings of the 3rd International Conference on Crowd Science and Engineering. Article No. 16. pp. 1-8. New York, NY, USA: Association for Computing Machinery. URL: https://doi.org/10.1145/3265689.3265705.

Wang, J., et al., "Stratified Transfer Learning for Cross-Domain Activity Recognition," In 2018 IEEE International Conference on Pervasive Computing and Communications (PerCom), 2018, pp. 1-10.

Zhao, H., et al., "Adversarial Multiple Source Domain Adaptation," NIPS'18: Proceedings of the 32nd International Conference on Neural Information Processing Systems. Dec. 2018. pp. 8568-8579.

* cited by examiner

UNSUPERVISED TRAINING OF AN ACTIVITY CLASSIFIER

BACKGROUND

Recently, the availability and use of wearable devices have increased significantly. Wearable devices typically have various capabilities and can provide users with a wide range of features, such as facilitating communications (e.g., calls, messages, etc.), facilitating the consumption of entertainment (e.g., listening to audio content, etc.), facilitating payment, tracking health and/or wellness measures (e.g., sleep, activity, and the like), activity tracking, and the like. In connection with activity, health, and/or wellness tracking, one such feature and/or function typically provided by wearable devices is activity classification. Activity classification generally employs a machine learning model, and although labeled data for wrist worn wearable devices for training such a machine learning model is plentiful, labeled data for training a machine learning model for wearable devices to be worn on other parts of the body may be more difficult and/or expensive to obtain.

BRIEF DESCRIPTION OF DRAWINGS

The detailed description is described with reference to the accompanying figures.

DETAILED DESCRIPTION

Figure 1:
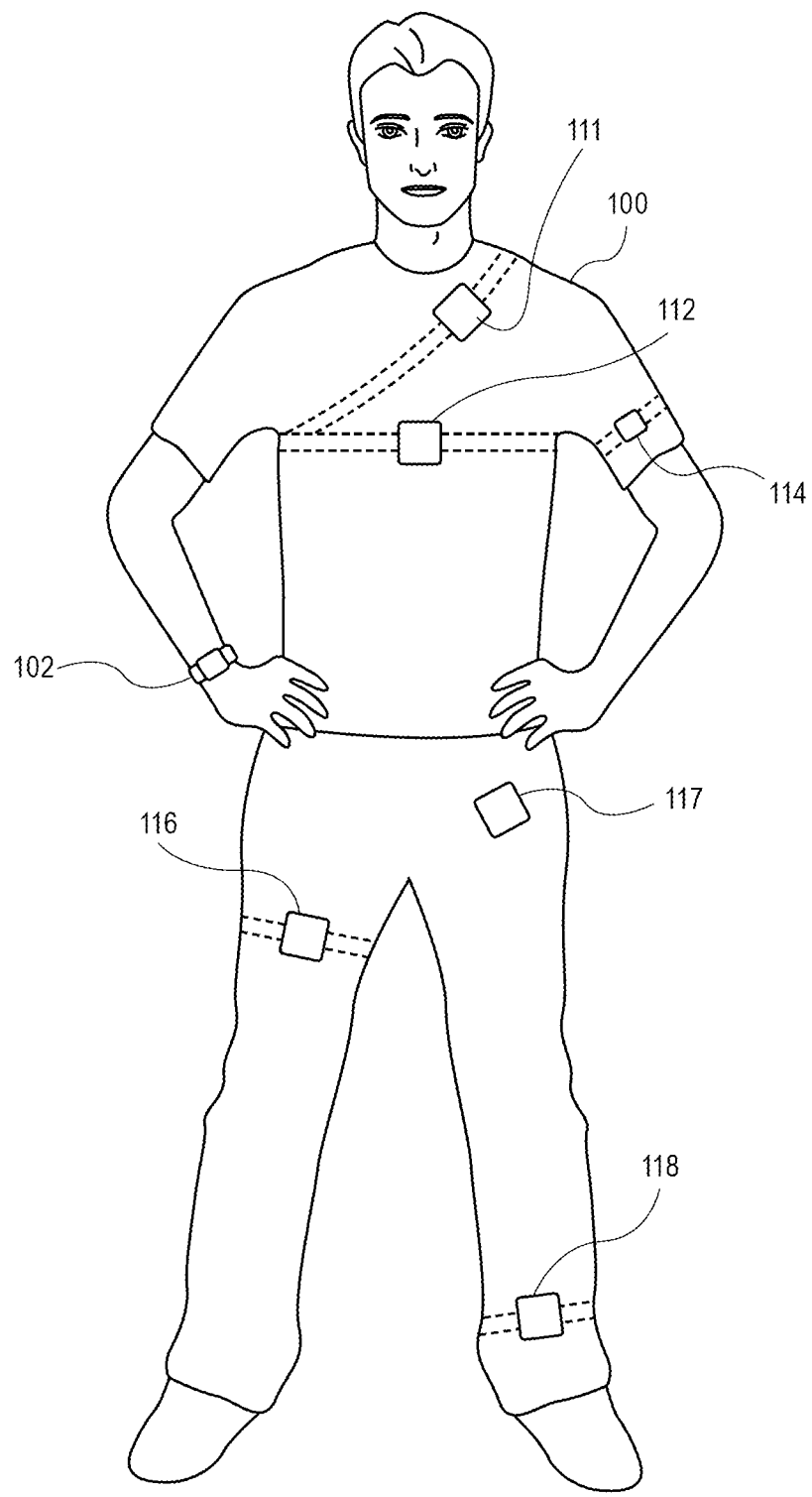
FIG. 1 is an illustration of a user with exemplary wearable devices worn at different locations, according to exemplary embodiments of the present disclosure.

As set forth in greater detail below, exemplary embodiments of the present disclosure are generally directed to systems, methods, and devices to facilitate unsupervised training of an activity classifier for movement measured at a target location of a user using a trained source activity classifier configured to determine an activity based on motion measured at a source location of a user. For example, the source location may include a location (e.g., wrist of a user, etc.) for which a trained classifier exists and/or labeled training data is readily accessible, and the target location may include a location (e.g., the chest, upper arm, upper leg, hip, ankle, etc.) for which a trained classifier does not exist and/or labeled training data is not readily accessible, expensive to obtain, and the like. Accordingly, the exemplary embodiments of the present disclosure may be employed, for example, to perform unsupervised training of an activity classifier for a wearable device designed to be worn at a target location of a user in circumstances where a trained activity classifier may not exist for the target location and/or labeled training data for the target location may not exist, may be difficult and/or expensive to obtain, and the like.

Exemplary embodiments of the present disclosure may utilize a trained source activity classifier, which may include a trained source embedding generator and a trained source classifier for a source location of a user, to train a target activity classifier for a target location of a user. The source embedding generator may be used to generate source embeddings that are representative of motion measured at a source location of a user, which may then be used to train the target activity classifier for the target location of a user in an unsupervised manner. In an exemplary implementation, unlabeled source motion information and unlabeled target motion information may be simultaneously and/or concurrently measured and/or obtained at a particular time. For example, source motion information may be measured using a motion sensor (e.g., inertial measurement unit, accelerometer, etc.) positioned at the source location of user, and target motion information may be measured using a further motion sensor positioned at the target location. The source motion information may be provided as an input to the source activity classifier associated with the source location of a user to generate a source embedding representative of the source motion measured at the source location of the user. The source embedding and the target motion information may then be provided as training inputs to the target activity classifier for the target location of a user, so that a target embedding generator of the target activity classifier can reconstruct the source embedding for the target motion without the use of any labeled training data. In training the target activity classifier, a loss function minimizing an error between the source embedding and the target embedding can be optimized in training the target embedding generator of the target activity classifier.

In an exemplary implementation where labeled training data for the target location is unavailable, weights from the trained source classifier may be employed by the target activity classifier. Alternatively and/or in addition, in an exemplary implementation where labeled training data for the target location is available, the target activity classifier may also be trained using the labeled training data.

Exemplary embodiments of the present disclosure may be employed to retrain an activity classifier for a new location on a user. For example, an activity classifier associated with a wearable device that was originally configured and intended to be worn at a first location of a user may be retrained using exemplary embodiments of the present disclosure, so that the wearable device can be configured to be worn at a second location that is different than the first location and the activity classifier is configured to predict activity classifications based on motion measured by the wearable device at the second location. Such retraining of an activity classifier can facilitate wearing of a wearable device at different locations on the user in the event that the original location was not ideal for the user (e.g., as a result of an injury, a medical condition such as dementia, autism spectrum disorder, and the like).

Advantageously, exemplary embodiments of the present disclosure can facilitate unsupervised training of a machine learning model by leveraging an existing trained machine learning model, so that the difficulty, time, expense, etc. of compiling labeled data may be avoided. Further, rather than attempting to learn the transfer function of the existing machine learning model, exemplary embodiments of the present disclosure may simply reconstruct embeddings for different input data (e.g., unlabeled motion data from the target location of a user). Additionally, although exemplary embodiments of the present disclosure are primarily described with respect to the unsupervised training of activity classifiers for wearable devices that may be worn at certain target locations, the exemplary embodiments of the present disclosure may be applicable in leveraging existing trained machine learning models to perform unsupervised training of another machine learning model without any labeled training data and/or having to learn the transfer function of the existing trained machine learning model.

FIG. 1 is an illustration of an exemplary user 100, according to exemplary embodiments of the present disclosure.

As shown in FIG. 1, user 100 may be wearing one or more wearable devices 102, 111, 112, 114, 116, 117, and/or 118. As illustrated, wearable device 102 may be worn on a wrist of user 100, wearable device 111 may be worn proximate a collar bone of user 100, wearable device 112 may be worn on a chest of user 100, wearable device 114 may be worn on an upper arm of user 100, wearable device 116 may be worn on an upper leg of user 100, wearable device 117 may be worn on a hip (e.g., hip pocket, etc.) of user 100, and wearable device 118 may be worn on an ankle of user 100. Although FIG. 1 illustrates wearable devices 102, 111, 112, 114, 116, 117, and/or 118 being worn on the wrist, collar bone, chest, upper arm, upper leg, hip, and/or ankle of user 100, exemplary embodiments of the present disclosure contemplate a wearable device worn at nearly any location of user 100. Further, each wearable device 102, 111, 112, 114, 116, 117, and/or 118 may include a motion sensor configured to measure motion at each respective location. Alternatively and/or in addition, exemplary embodiments of the present disclosure may be implemented in connection with other devices (e.g., mobile phones, smartphones, personal data assistants, etc.) that include motion sensors, such as an inertial measurement unit, accelerometer, gyroscope, and the like.

In the exemplary implementation illustrated in FIG. 1, wearable device 102 worn on the wrist of user 100 may include a motion sensor (e.g., an inertial measurement unit (IMU), accelerometer, etc.) and be associated with a trained activity classifier that may have been trained, for example, using labeled wrist motion data. The trained activity classifier may include a trained machine learning model configured to predict an activity of user 100 (e.g., running, jumping, cycling, playing a certain sport, or participating in other exercise, watching television, sleeping, sitting, standing, walking, lying down, performing chores, eating, and the like) based on motion, movement, accelerations, etc. measured by the motion sensor of wearable device 102 at the wrist of user 100.

According to exemplary embodiments of the present disclosure, the trained activity classifier associated with wearable device 102 may be used to train one or more activity classifiers in connection with one or more of wearable devices 111, 112, 114, 116, 117, and/or 118, which may be worn on proximate a collar bone, chest, upper arm, upper leg, and/or ankle of user 100, respectively. Accordingly, in the exemplary implementation illustrated in FIG. 1, the trained activity classifier associated with wearable device 102 may be considered a source activity classifier and the wrist of user 100 may be considered a source location. Consequently, in exemplary implementations where the trained activity classifier associated with wearable device 102 is used to train one or more activity classifiers in connection with one or more of wearable devices 111, 112, 114, 116, 117, and/or 118, the activity classifiers associated with one or more of wearable devices 111, 112, 114, 116, 117, and/or 118 may be considered target activity classifiers, and the locations at which wearable devices 111, 112, 114, 116, 117, and/or 118 are worn, e.g., the collar bone, the chest, upper arm, upper leg, the hip, and/or ankle of user 100, may be considered to be target locations. According to exemplary embodiments of the present disclosure, a source location can include any location on user 100 for which a trained activity classifier exists and/or sufficient labeled training data is accessible. Similarly, a target location can include any location on user 100 for which an activity classifier may be trained using a trained source activity classifier.

In leveraging an existing trained source activity classifier to train a corresponding target activity classifier for a target location, it is preferred that the labels of the data used to train the trained source activity classifier are relevant to the input data at the target location. For example, in an exemplary implementation where the trained source activity classifier associated with wearable device 102 intended to be worn on a wrist of user 100, the labeled training data may include labeled data corresponding to motion at the wrist indicating that user 100 is exercising. Such labeled data would likely also correspond to motion of the upper arm of user 100 indicating that user 100 is exercising and would therefore be relevant in training a target activity classifier for a wearable device that may be intended to be worn on an upper arm of user 100. Conversely, labeled training data corresponding to motion at the wrist indicating that user 100 is typing would likely not be relevant in training a target activity classifier for a wearable device intended to be worn on an ankle of user 100.

Figure 2A:
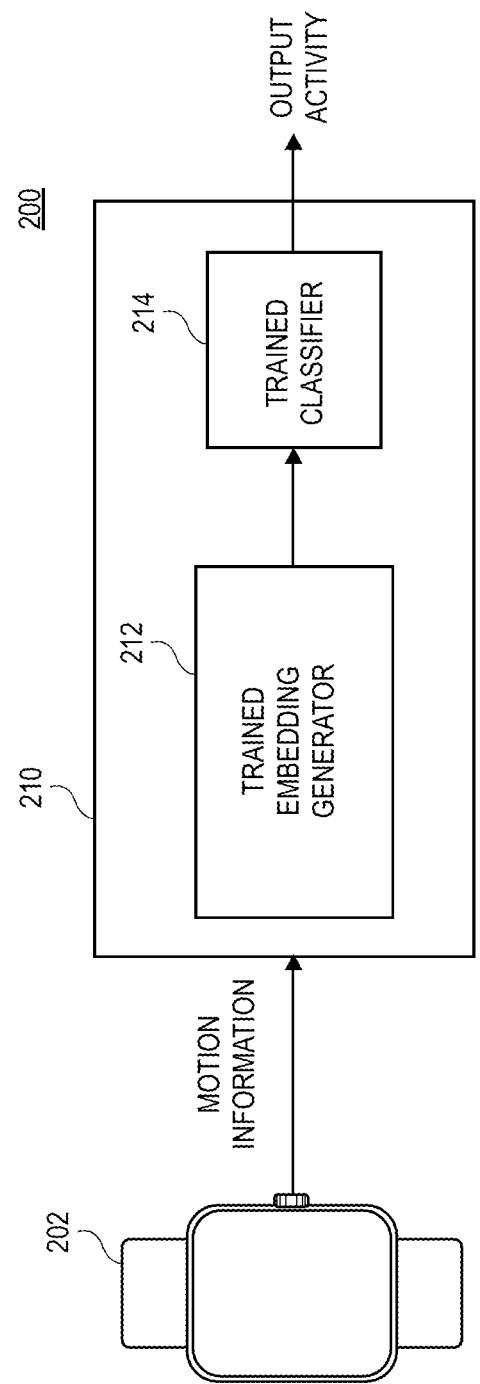
FIGS. 2A and 2B are block diagrams illustrating an exemplary source system and training of an exemplary target activity classifier, according to exemplary embodiments of the present disclosure.
Figure 2B:
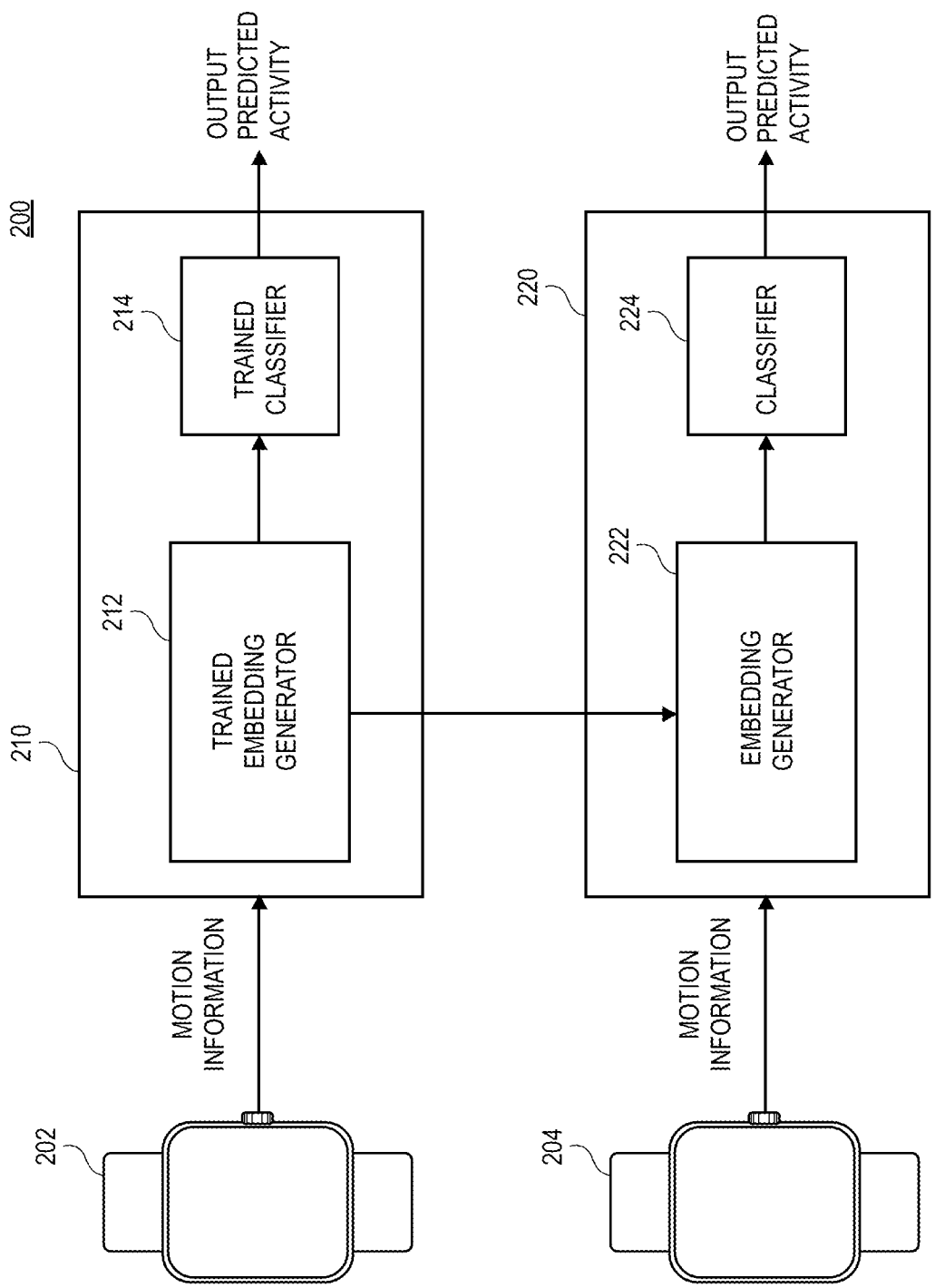

FIGS. 2A and 2B are block diagrams illustrating an exemplary source system 200 and training of an exemplary target activity classifier 220, according to exemplary embodiments of the present disclosure.

As shown in FIG. 2A, exemplary source system 200 may include source wearable device 202 and trained source activity classifier 210. Source system 200 may be associated with a source location of a user, which may correspond to any location for which a trained classifier exists and/or sufficient labeled training data is readily accessible. According to exemplary embodiments of the present disclosure, trained source activity classifier 210 may be implemented as part of and/or executed on source wearable device 202 or may be in communication with source wearable device 202 via a network connection or other wired, wireless, etc. connection. Source wearable device 202 may be configured to be worn at any source location (e.g., wrist, etc.) and may include a motion sensor (e.g., inertial measurement unit, accelerometer, etc.) configured to measure motion at the source location. The motion measured at the source location may be provided in the form of motion information to as an input to trained source activity classifier 210, which may be configured to predict an activity of the user based on the provided motion information. As shown in FIG. 2A, trained source activity classifier 210 may be configured to predict an activity of the user based on the input motion information. For example, source activity classifier 210 may be configured to predict, based on the motion information, the type of activity the user is participating in, such as exercising (e.g., running, jumping, cycling, playing a certain sport, etc.), watching television, sleeping, sitting, standing, walking, lying down, performing chores (e.g., cleaning, folding laundry, etc.), eating, and the like.

According to exemplary embodiments of the present disclosure, source activity classifier 210 may include trained source embedding generator 212 and trained source classifier 214. Trained source embedding generator 212 may be configured to generate source embeddings representative of the motion measured at the source location. For example, the source embeddings generated by trained source embedding generator 212 may include vectors of d dimensions, and trained source classifier 214 may include a learned weight matrix, which may be applied to the source embeddings to obtain a probability vector. The probability vector can assign probabilities to various activities that represent a likelihood that the user may be participating in each respective activity based on the motion measured by source wearable device 202. The activity with the highest probability may be provided as the output activity, as shown in FIG. 2A, or the probability vector may be provided to downstream systems and/or processes for further processing depending on the application that may be utilizing the probability vector.

According to exemplary embodiments of the present disclosure, source activity classifier 210 may have been trained using labeled training data to meet a threshold accuracy in predicting the activity of the user based on motion measured at the source location of wearable device 202. For example, source activity classifier 210 may have been trained using a labeled training data set Da, which may be represented as:

$$D_\alpha = \{[\vec{a}(t)_\alpha, \vec{l}(t)]\}$$

where $\alpha$ can represent the source location, $\vec{a}(t)_\alpha$ can represent the motion measured at the source location as a function of time (e.g., as an acceleration vector signal, etc.), and $\vec{l}(t)$ can represent the labels corresponding to the measured motion $\vec{a}(t)_\alpha$. Using training data set $D_\alpha$, source activity generator 210 may be represented as a trained machine learning model $M_\alpha^\theta$:

$$M_\alpha^\theta = \phi(W_\alpha e_\alpha^\theta(a_\alpha))$$

where $\phi$ can represent a multi-dimensional logistic function, $W_\alpha$ can represent the weight matrix of trained classifier 214, $e_\alpha^\theta$ can represent the source embedding generated by trained source embedding generator 212 as a function of the measured motion $a_\alpha$, and $\theta$ can represent the parameters of model $M_\alpha^\theta$.

FIG. 2B is a block diagram illustrating using source activity classifier 210 to train an exemplary target activity classifier 220, according to exemplary embodiments of the present disclosure.

FIG. 2B illustrates an exemplary implementation of the present disclosure where source activity classifier 210 may be used to train target activity classifier 220. As shown in FIG. 2B, source activity classifier 210 may be associated with source wearable device 202 (which may be worn at a source location of a user) and may be configured to predict an activity (e.g., OUTPUT PREDICTED ACTIVITY in FIG. 2B) of the user based on motion measured by source wearable device 202 (or other motion sensing device positioned at the source location). Similarly, target activity classifier 220 may be associated with target wearable device 204 and may be trained to predict an activity (e.g., OUTPUT PREDICTED ACTIVITY in FIG. 2B) of the user based on motion measured by target wearable device 204 (or other motion sensing device positioned at the target location). The source location of the user may correspond to any location for which a trained classifier exists (e.g., source activity classifier 210) and/or sufficient labeled training data is readily accessible, while the target location of the user may correspond to a location for which a trained classifier does not exist and/or sufficient labeled training data is not readily accessible. According to exemplary embodiments of the present disclosure, once trained, trained target activity classifier 220 may be implemented as part of and/or executed on target wearable device 204 or may be in communication with target wearable device 204 via a network connection or other wired, wireless, etc. connection, to predict an activity classification based on motion measured at the target location.

As shown in FIG. 2B, source activity classifier 210 may include trained source embedding generator 212 and trained source classifier 214. Trained source embedding generator 212 may be configured to generate source embeddings representative of the motion measured at the source location (e.g., by source wearable device 202). According to exemplary embodiments of the present disclosure, the source embeddings generated by trained source embedding generator 212 may be used to train target embedding generator 222 of target activity classifier 220. For example, rather than attempting to learn the transfer function of source activity classifier 210, exemplary embodiments of the present disclosure may simply train target embedding generator 222 to reconstruct the source embeddings generated by trained source embedding generator 212 for the target motion information without using any labeled training data.

To train target embedding generator 222 to learn the source embeddings generated by source embedding generator 212, in an exemplary implementation of the present disclosure, source motion information and target motion information may be substantially simultaneously obtained (e.g., at a particular time, etc.) from source wearable device 202 and target wearable device 204, respectively. For example, source motion information may include motion measured by a motion sensor, such as an accelerometer, gyroscope, and/or inertial measurement unit (IMU), associated with source wearable device 202 and target motion information may include motion measured by a motion sensor, such as an accelerometer and/or inertial measurement unit (IMU), associated with target wearable device 204. Alternatively and/or in addition, source motion information and target motion information may be obtained from any motion sensing device positioned at the source location and the target location, respectively.

The obtained source motion information may then be provided to trained source activity classifier 210 and the simultaneously obtained target motion information may be provided to target activity classifier 220. Based on the source motion information, trained source embedding generator 212 may generate a source embedding representative of the source motion information. The generated source embedding may be used to train target embedding generator 222 of target activity classifier 220 to reconstruct the source embedding from the target motion information obtained at the target location to minimize reconstruction loss between the source embedding and the target embedding. According to exemplary embodiments of the present disclosure, reconstruction of the embeddings can be represented as:

$$\hat{\varphi} = MAE[e_\beta^\alpha(a_\beta), e_\alpha^\theta(a_\alpha)] | D_{\alpha\beta}$$

where MAE can represent a mean absolute error loss function, $a_\beta$ can represent the motion measured at the target location, $a_\alpha$ can represent the motion measured at the source location, $e_\beta^\alpha$ can represent the reconstructed target embedding generated by target embedding generator 222 as a function of the measured motion $\alpha_\beta$ at the target location, $e_\alpha^\theta$ can represent the source embedding generated by trained source embedding generator 212 as a function of the measured motion da at the source location, and $D_{\alpha\beta}$ can represent the unlabeled motion data that is simultaneously obtained at the target location and the source location. According to aspects of the present disclosure, the loss function may also include an $L_1$ or $L_2$ regularization term. Exemplary embodiments of the present disclosure also contemplate utilizing other loss functions (e.g., a mean squared error loss function, a cosine similarity loss function, a mean squared logarithmic error loss function, and the like) in training target embedding generator 222. Accordingly, the loss function can be optimized to minimize the error between the source embedding generated by source embedding generator 212 and the target embedding generated by target embedding generator 222.

Once target embedding generator 222 is trained using the target motion information and the source embeddings generated by trained source embedding generator 212, the weights of classifier 224 can be set to the weights of trained classifier 214. Accordingly, target activity generator 220 may be represented as a trained machine learning model $M_\beta^\varphi$:

$$M_\beta^\varphi = \phi(W_\beta e_\beta^\varphi(a_\beta))$$

where $\phi$ can represent a multi-dimensional logistic function, $W_\beta$ can represent the weight matrix of classifier 224, $e_\beta^\varphi$ can represent the target embedding generated by target embedding generator 222 as a function of the measured motion $a_\beta$ at the target location, and $\varphi$ can represent the parameters of model $M_\beta^\varphi$. Accordingly, an executable trained target activity classifier 220 may then be generated and associated with the target location of the user.

Alternatively and/or in addition, in exemplary implementations where labeled training data for the target location can be obtained or is otherwise available, target activity classifier 220 can be trained with the labeled training data to regularize the source and target embeddings while optimizing target activity classifier 220. For example, the labeled data can be used to train target activity classifier 220 to obtain optimized weights rather than use the weights from trained source classifier 214, while also regularizing the embeddings to be similar to each other. According to exemplary embodiments of the present disclosure, a loss function used to train target activity classifier 220 may be represented as:

$$L = CE(y, \hat{y}) + \lambda_1 MAE(e_\beta, e_\alpha) + \lambda_2 L_1(W)$$

where $CE(y, \hat{y})$ can represent the cross entropy between predicted activity class y and measured activity class $\hat{y}$, $MAE(e_\beta, e_\alpha)$ can represent a mean absolute error function of the target embedding $e_\beta$ generated by target embedding generator 222 and source embedding ex generated by trained source embedding generator 212, and $\lambda_2 L_1(W)$ can represent an $L_1$ regularization term. Exemplary embodiments of the present disclosure also contemplate utilizing other loss functions in training target embedding generator 222. Accordingly, an executable trained target activity classifier 220 may be generated based on the optimization of loss function L and associated with the target location of the user. Once trained, trained target activity classifier 220 may be utilized to determine predicted activity classifications based on motion measured at the target location.

Figure 3:
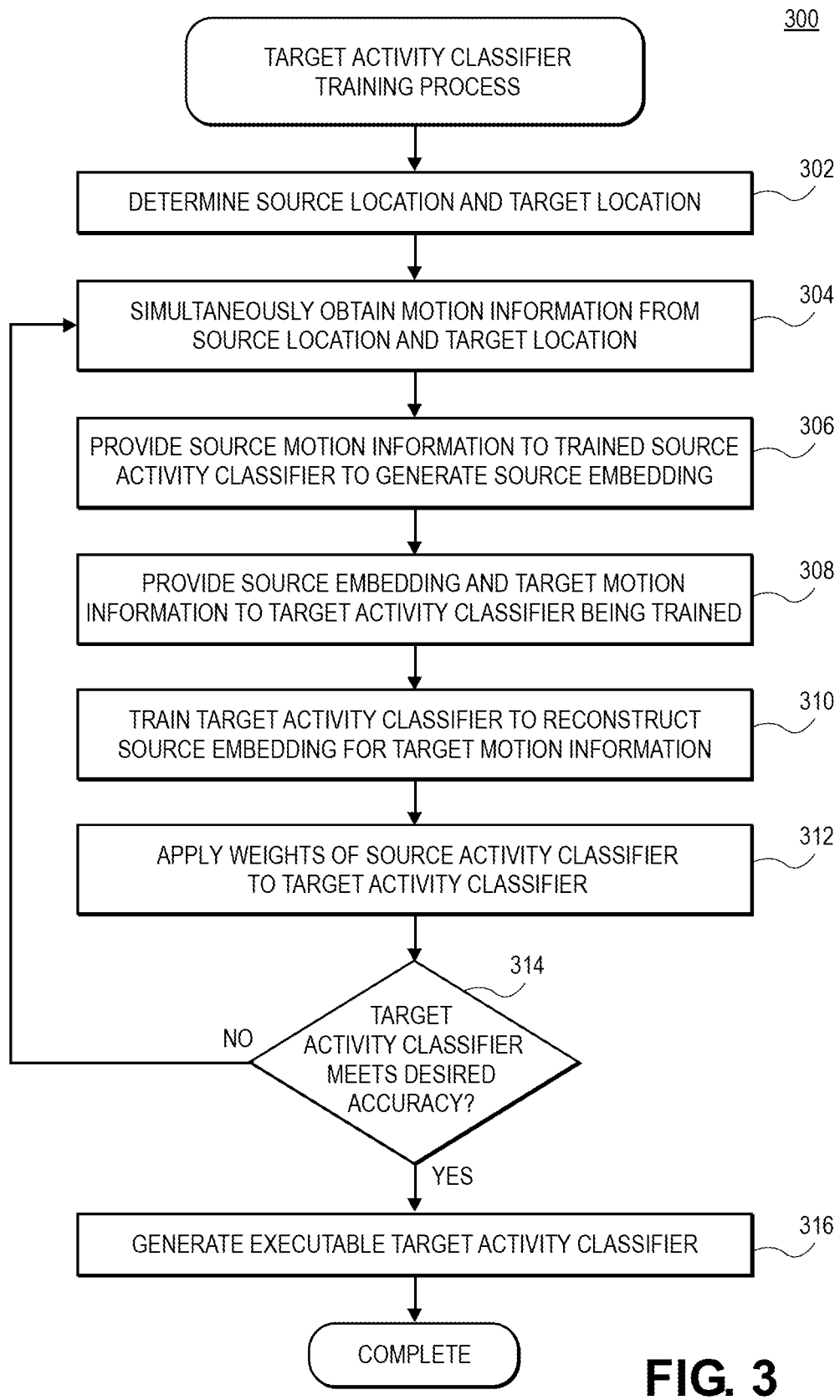
FIG. 3 is a flow diagram of an exemplary target activity classifier training process, according to exemplary embodiments of the present disclosure.

FIG. 3 is a flow diagram of an exemplary target activity classifier training process 300, according to exemplary embodiments of the present disclosure.

As shown in FIG. 3, process 300 may begin with determining a source and a target location, as in step 302. This may be performed, for example, in exemplary implementations where an activity classifier for a particular location (e.g., a target location) is retrained for a different location (e.g., a source location). After the source and target locations have been determined, motion information from a source location and a target location may be substantially simultaneously and/or concurrently obtained (e.g., at a particular time and/or at the same time, etc.), as in step 304. For example, source motion information may be obtained from a motion sensor, which may be implemented in a wearable device or other device positioned at a source location of a user, and target motion information may be obtained from a second motion sensor, which may be implemented in a wearable device or other device positioned at a target location of the user. A source location may correspond to a location on the user for which a trained classifier exists and/or sufficient labeled training data is readily accessible, whereas the target location of the user may correspond to a location of the user for which a trained classifier does not exist and/or sufficient labeled training data is not readily accessible. In exemplary implementations where an activity classifier is being retrained for a new location, the original location for which the activity classifier was originally trained can be the source location and the new location for which the activity classifier is being retrained can include the target location. According to certain aspects of the present disclosure, the source location may include a wrist of the user and the target location of the user may include a collar bone, chest, upper arm, hip, upper leg, ankle, etc. of the user.

After the source motion information and the target motion information have been obtained, the source motion information may be provided to a trained source activity classifier to obtain a source embedding representative of the source motion information, as in step 306. For example, the source embedding may be a vector of d dimensions representing various features of the source motion information. In addition to providing the source motion information to the trained source activity classifier to obtain the source embedding, the target motion information may also be provided to the target activity classifier being trained, as in step 308.

In step 310, the target activity classifier may be trained to reconstruct the source embedding obtained from the source activity classifier for the target motion information provided to the target activity classifier. Accordingly, rather than attempt to learn the transfer function of the source activity classifier, exemplary embodiments of the present disclosure train the target activity classifier to reconstruct the source embeddings generated by the trained source activity classifier for the target motion information without using any labeled training data. For example, a loss function representing an error (e.g., a mean squared error a mean absolute error, a mean squared logarithmic error, and the like) between the source embedding and the embedding generated by the target activity classifier may be optimized in training the target activity classifier to reconstruct the source embedding.

After the target activity classifier has been trained to reconstruct the source embeddings, weights (e.g., in the form of a weight matrix, and the like) associated with the source activity classifier may be applied to the target activity classifier, as in step 312. Weights of the target activity classifier can be set to the weights of the source activity classifier. According to exemplary embodiments of the present disclosure, the weights may be applied to the embeddings generated by the activity classifiers to obtain a probability vector. The probability vector can assign probabilities to various activities that represent a likelihood that the user may be participating in each respective activity based on the motion information. The activity with the highest probability may be provided as the output activity by the activity classifiers. In step 314 it may be determined whether the target activity classifier meets a desired accuracy in predicting activity classifications. If the target activity classifier does not meet the desired accuracy, process 300 can return to step 304 to obtain additional motion information from the source location and the target location. In the event that the target activity classifier meets the desired accuracy, an executable trained target activity classifier may be generated, as in step 316.

Figure 4:
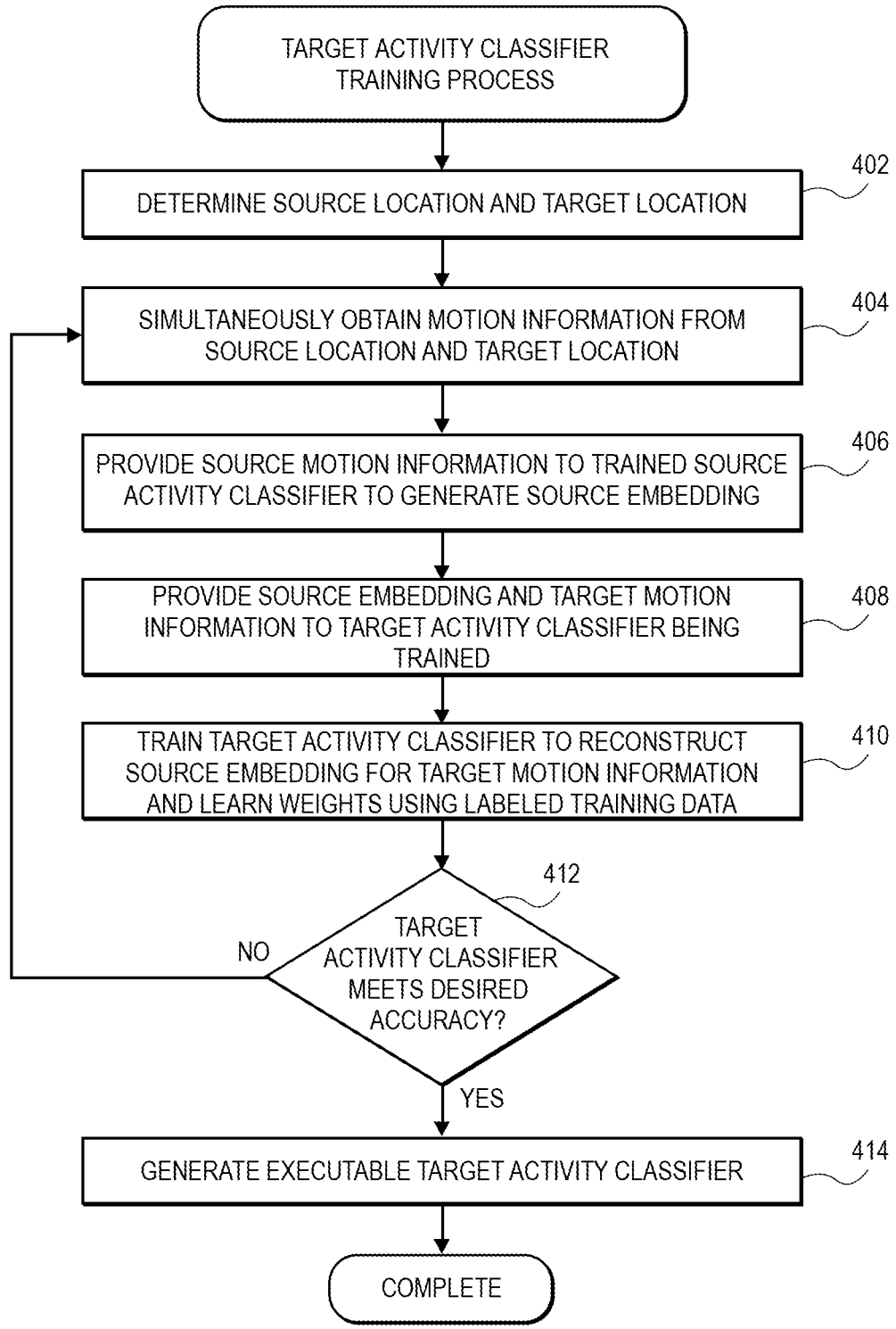
FIG. 4 is a flow diagram of an exemplary target activity classifier training process, according to exemplary embodiments of the present disclosure.

FIG. 4 is a flow diagram of an exemplary target activity classifier training process 400, according to exemplary embodiments of the present disclosure. Process 400 illustrated in FIG. 4 may be substantially similar to process 300 shown in FIG. 3, however, rather than apply the weights of the source activity classifier to the target activity classifier, process 400 describes a process where the target activity classifier is trained using labeled training data.

As shown in FIG. 4, process 400 may begin with determining a source and a target location, as in step 402. This may be performed, for example, in exemplary implementations where an activity classifier for a particular location (e.g., a target location) is retrained for a different location (e.g., a source location). After the source and target locations have been determined, motion information from a source location and a target location may be simultaneously and/or concurrently obtained (e.g., at a particular time and/or at the same time, etc.), as in step 404. For example, source motion information may be obtained from a motion sensor, which may be implemented in a wearable device or other device positioned at a source location of a user, and target motion information may be obtained from a second motion sensor, which may be implemented in a wearable device or other device positioned at a target location of the user. A source location may correspond to a location on the user for which a trained classifier exists and/or sufficient labeled training data is readily accessible, whereas the target location of the user may correspond to a location of the user for which a trained classifier does not exist and/or sufficient labeled training data is not readily accessible. In exemplary implementations where an activity classifier is being retrained for a new location, the original location for which the activity classifier was originally trained can be the source location and the new location for which the activity classifier is being retrained can include the target location. According to certain aspects of the present disclosure, the source location may include a wrist of the user and the target location of the user may include a collar bone, chest, upper arm, hip, upper leg, ankle, etc. of the user.

After the source motion information and the target motion information have been obtained, the source motion information may be provided to a trained source activity classifier to obtain a source embedding representative of the source motion information, as in step 406. For example, the source embedding may be a vector of d dimensions representing various features of the source motion information. In addition to providing the source motion information to the trained source activity classifier to obtain the source embedding, the target motion information may also be provided to the target activity classifier being trained, as in step 408.

In exemplary implementations where labeled training data for the target location is available, in step 410, the target activity classifier may be trained using the labeled training data to optimize the target activity classifier and to reconstruct the source embedding obtained from the source activity classifier for the target motion information provided to the target activity classifier. In exemplary implementations, the labeled data can be used to train the target activity classifier to obtain optimized weights (e.g., rather than use the weights from the trained source classifier), while also regularizing the embeddings to be similar to each other. For example, a loss function representing a cross entropy between predicted and measured activities, an error (e.g., a mean squared error a mean absolute error, a mean squared logarithmic error, and the like) between the source embedding and the embedding generated by the target activity classifier, and an $L_1$ regularization term may be optimized in training the target activity classifier to reconstruct the source embedding. In step 412 it may be determined whether the target activity classifier meets a desired accuracy in predicting activity classifications. If the target activity classifier does not meet the desired accuracy, process 400 can return to step 404 to obtain additional motion information from the source location and the target location. In the event that the target activity classifier meets the desired accuracy, an executable trained target activity classifier may be generated, as in step 414.

Figure 5:
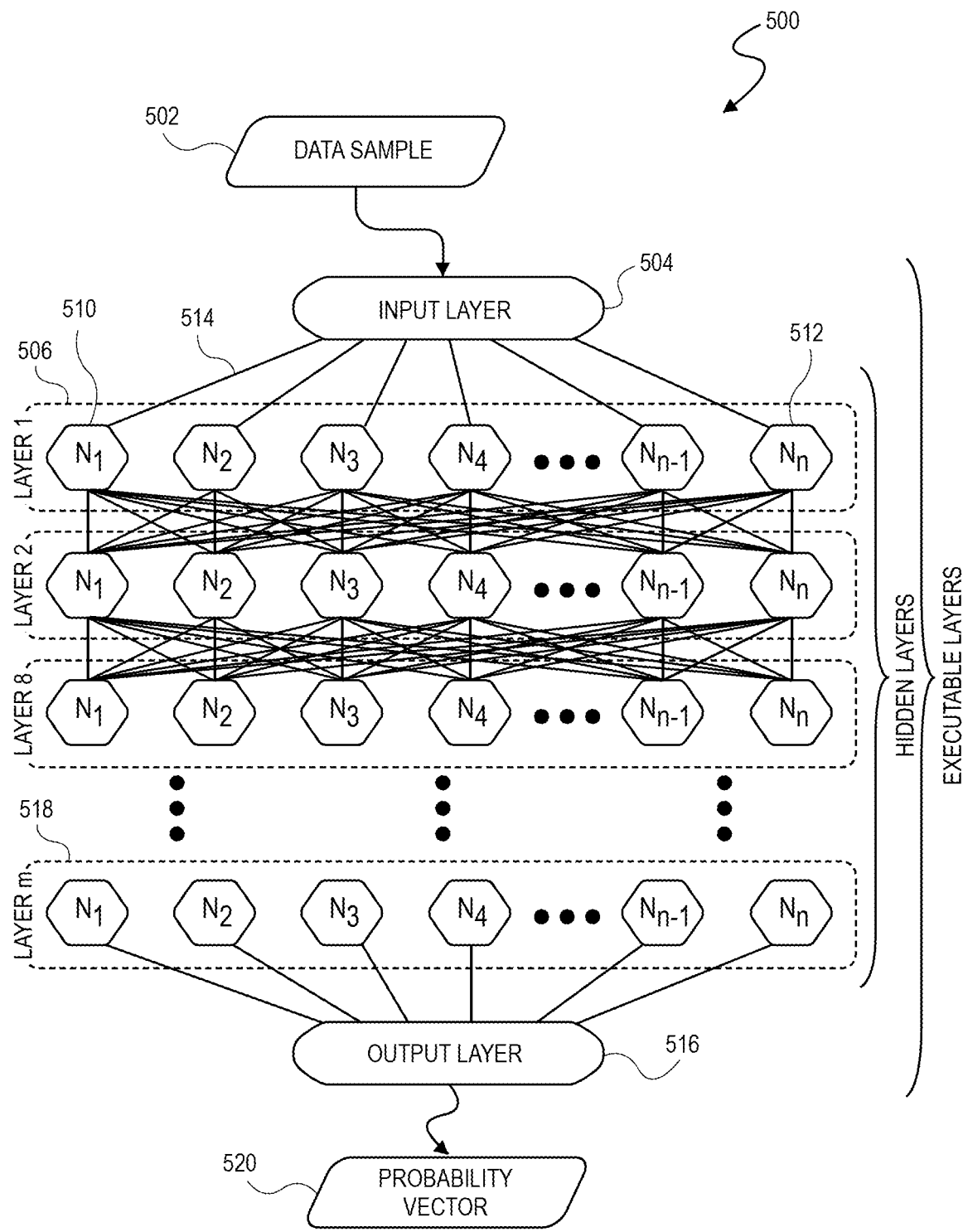
FIG. 5 is a block diagram illustrating exemplary components of an exemplary machine learning model, according to exemplary embodiments of the present disclosure.

FIG. 5 is a block diagram illustrating exemplary components of an exemplary machine learning model 500, also called a deep neural network, which can be suitably trained to classify input data, according to exemplary embodiments of the present disclosure.

As those skilled in the art will appreciate, machine learning model 500 can include multiple executable layers, including input layer 504, output layer 516, and one or more hidden layers. By way of illustration, exemplary machine learning model 500 includes m hidden layers, including hidden layers 506 and 518. Input layer 504 accepts the input data sample 502, such as motion information, etc., for which the machine learning model 500 is to classify the data sample into one of a plurality of activity classes.

Input layer 504 accepts the input data sample and, according to one or more predetermined algorithms and/or heuristics embedded within the various layers, maps the input through a series of process layers, each layer outputting values. These values, not shown in FIG. 5, but implied by the various edges, such as edge 514, extending from input layer 504 to the various processing nodes of first hidden layer 506, constitute at least some of the output of the input layer and are distributed as input data or input values to processing nodes of first hidden layer 506 of the machine learning model 500, such as processing nodes 510 and 512.

Typically, though not exclusively, the one or more values or facets of the input data sample passed from the input layer 504 to a first processing node in the first hidden layer, such as processing node 510 of first hidden layer 506, is different than a value/facet passed to a second processing node of that same hidden layer, such as to processing node 512 of first hidden layer 506.

Each hidden layer, including hidden layers 506 and 518, comprises a plurality of processing, convolutional, or long short-term memory (LSTM) network nodes. According to an exemplary implementation of the present disclosure, the hidden layers may include one or more convolution layers followed by one or more LSTM layers and an embedding may be generated at any one of hidden layers 506 and 518. By way of illustration and not limitation, first hidden layer 506 includes n processing nodes, $N_1$-$N_n$. While the processing nodes of first hidden layer 506 typically, though not exclusively, have a single input value from input layer 504, processing nodes of subsequent hidden layers typically have input values from one or more processing nodes of the previous input layer. Of course, in various implementations, the processing nodes of first hidden layer 506 may receive, as input values, all output values of the input layer 504.

In various implementations and as illustrated in executable machine learning model 500, each hidden layer (except for first hidden layer 506) accepts input data/signals from each processing node of the prior hidden layer, as indicated by the edges proceeding from a processing node of an "upper" hidden layer (e.g., layer 506) to a "lower" hidden layer. Of course, alternative implementations need not include such wide distribution of output values to the processing nodes of a subsequent, lower level.

Each processing node implements one or more "convolutions," "computations" or "transformations" on the input data it receives (whether the processing node receives a single-item of input data, or plural items of input data) to produce a single output value. These convolutions, projections, and/or transformations may include any number of functions or operations to generate the output data such as, by way of illustration and not limitation, data aggregations, clustering various input values, transformations of input values, combinations of plural input values, selections and/or filters among input values, mathematical manipulations of one or more input values, linear and/or multivariate regressions of the input values, statistical determinations of the input values, predictive evaluations, and the like. Moreover, individual items of input data may be weighted in any given processing node, such that the weighted input data plays a greater or lesser role in the overall computation for that processing node. Items of input data may be weighted in such a manner as to be ignored in the various convolutions and computations. Hyperparameters (data/values that are input from sources external to processing nodes of a prior input level) may also be utilized by all or some of the processing nodes of a hidden layer.

As will be appreciated by those skilled in the art, one of the interesting aspects of training machine learning models is that the various executable levels are adaptable to accommodate self-learning. In other words, when provided feedback, modifications are made to the weights, parameters, and processing or convolutional operations of the processing nodes in the various layers, in order to achieve better results. Due to this adaptability, except for initially established computations of the various processing nodes in a training phase of the machine learning process, a person is unlikely to have specific insight or knowledge as to the exact nature of output values and, correspondingly, the exact nature of convolutions and/or computations that any particular processing node of a hidden layer may utilize. Instead, during the training process of a machine learning model, the machine learning model adaptively makes its own determinations as to how to modify each computation, convolution or transformation of a given processing node to produce better and/or superior results from the input values it receives. As discussed herein, these determinations may be guided by adjustments to the training data samples and/or the loss function used during training of the machine learning model.

At the final hidden layer, e.g., layer 518, the processing nodes provide their output data to output layer 516. Output layer 516 may include a dense layer and performs whatever final aggregations, calculations, transformations, projections, normalizations and/or interpretations of the various items of input data to produce a probability vector 520 that includes a probability score for each of a plurality of classes indicating a probability that the input data sample corresponds to the class.

Figure 6:
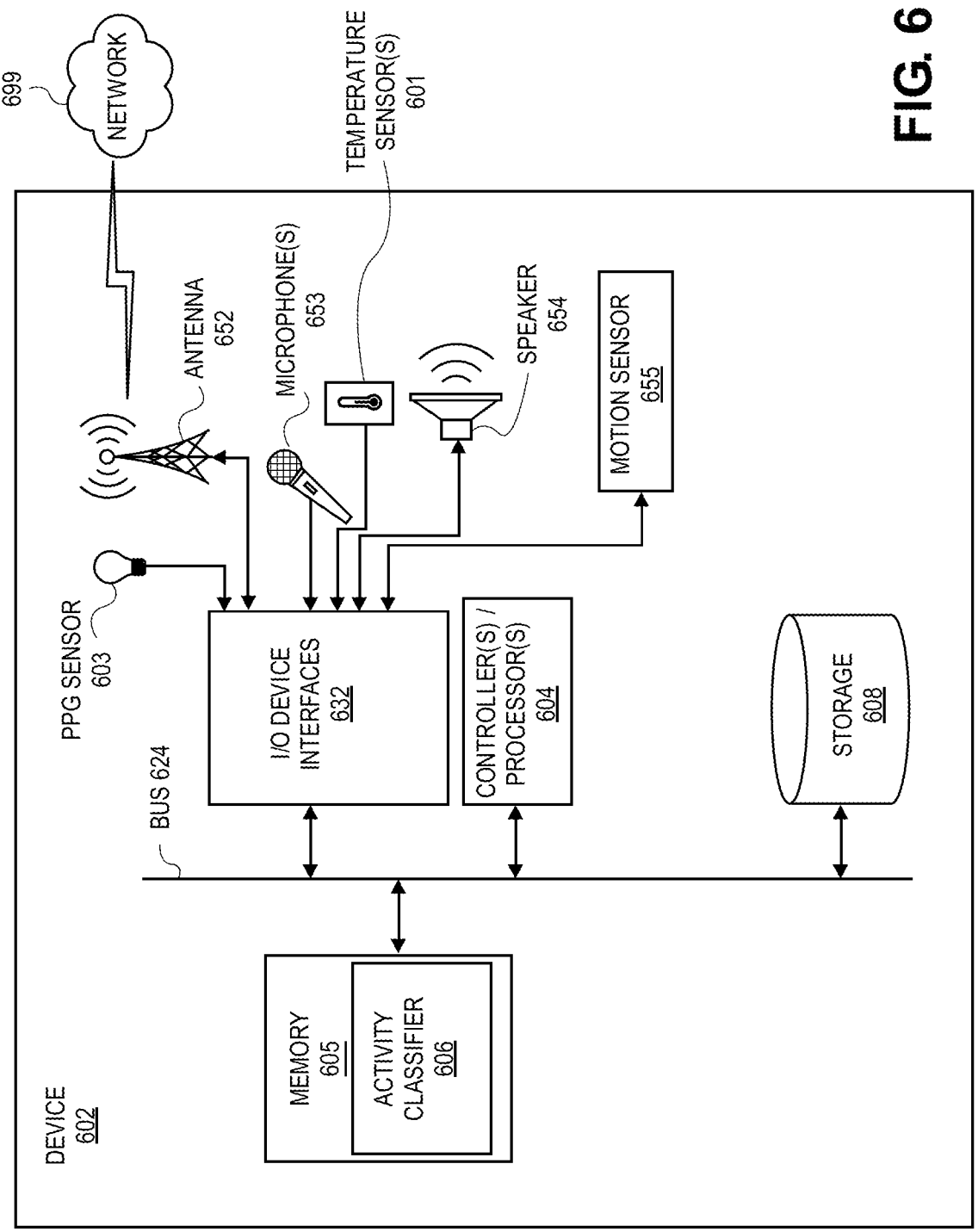
FIG. 6 is a block diagram illustrating exemplary components of a wearable device, according to exemplary embodiments of the present disclosure.

FIG. 6 is a block diagram conceptually illustrating a wearable device 602 that may be used with exemplary implementations as an activity tracker.

As shown in FIG. 6, wearable device 602 may include one or more controllers/processors 604, that may each include a central processing unit (CPU) for processing data and computer-readable instructions, and a memory 605 for storing data and instructions of wearable device 602. Memory 605 may individually include volatile random-access memory (RAM), non-volatile read only memory (ROM), non-volatile magnetoresistive (MRAM) and/or other types of memory. Wearable device 602 may also include data storage component 608, for storing data, controller/processor-executable instructions, activity information, motion information, an activity classifier, etc. Each data storage component may individually include one or more non-volatile storage types, such as magnetic storage, optical storage, solid-state storage, etc. Wearable device 602 may also be connected to removable or external non-volatile memory and/or storage (such as a removable memory card, memory key drive, networked storage, etc.) through respective input/output device interfaces 632.

Computer instructions for operating wearable device 602 and its various components may be executed by controller(s)/processor(s) 604, using the memory 605 as temporary "working" storage at runtime. The executable instructions of wearable device 602 may be stored in a non-transitory manner in non-volatile memory 605, storage 608, or an external device(s). Alternatively, some or all of the executable instructions may be embedded in hardware or firmware on the respective device in addition to or instead of software.

For example, if the user device is configured to receive time-series data from its own sensors and/or sensors of other devices and process that data, memory 605 may store program instructions that, when executed by controller(s)/processor(s) 604, cause controller(s)/processors 604 to process the time-series data using activity classifier 606 to determine an activity classification, as discussed herein.

Wearable device 602 further includes input/output device interfaces 632. A variety of components may be connected through the input/output device interfaces. Additionally, wearable device 602 may include address/data bus 624 for conveying data among components of the respective device. Each component within wearable device 602 may also be directly connected to other components in addition to (or instead of) being connected to other components across the bus 624.

Referring to wearable device 602 of FIG. 6, wearable device 602 may be "headless" and may primarily rely on spoken commands for input and/or through interaction with one or more control interfaces or buttons. In other examples, wearable device 602 may include a display, which may allow a touch-based interface. Wearable device 602 may also include input/output device interfaces 632 that connect to a variety of components, such as an audio output component, such as a speaker 654, a wired headset or a wireless headset, and/or other components capable of outputting audio. Wearable device 602 may also include an audio capture component. The audio capture component may be, for example, microphone 653 or array of microphones, a wired headset or a wireless headset, etc. Microphone 653 may be configured to capture audio, such as noises in an environment where the user is sleeping. If an array of microphones is included, approximate distance to a sound's point of origin may be determined using, for example, acoustic localization based on time and amplitude differences between sounds captured by different microphones of the array.

Wearable device 602 may also include other sensors that collect sensor data, that may be included in time-series data. Any number and/type of sensors may be included in the device. In the illustrated example, in addition to microphone 653, wearable device 602 includes photoplethysmography (PPG) sensor 603, which may include a light source and a photodetector configured to measure reflected and/or transmitted light to obtain measurements in variations of the blood flow, temperature sensor(s) 601, and one or more motion sensors 655, such as an accelerometer, gyroscope, inertial measurement unit, etc., to measure movements of the user.

Wearable device 602 may also include a communication interface, such as antenna 652, to send and/or receive time-series data from other devices. Any form of wired and/or wireless communication may be utilized to facilitate communication between wearable device 602 and other devices. For example, any one or more of 802.15.4 (ZIGBEE), 802.11 (WI-FI), 802.16 (WiMAX), BLUETOOTH, Z-WAVE, near field communication ("NFC"), etc., may be used to communicate between wearable device 602 and one or more sensors and/or appliances. For example, via antenna(s) 652, input/output device interfaces 632 may connect to one or more networks 699 via a wireless local area network (WLAN) (such as Wi-Fi) radio, Bluetooth, and/or wireless network radio, such as a radio capable of communication with a wireless communication network such as a Long-Term Evolution (LTE) network, WiMAX network, 3G network, etc. A wired connection such as Ethernet may also be supported.

The components of wearable device 602, as illustrated in FIG. 6, are exemplary and may be located as a stand-alone device or may be included, in whole or in part, as a component of a larger device or system.

Figure 7:
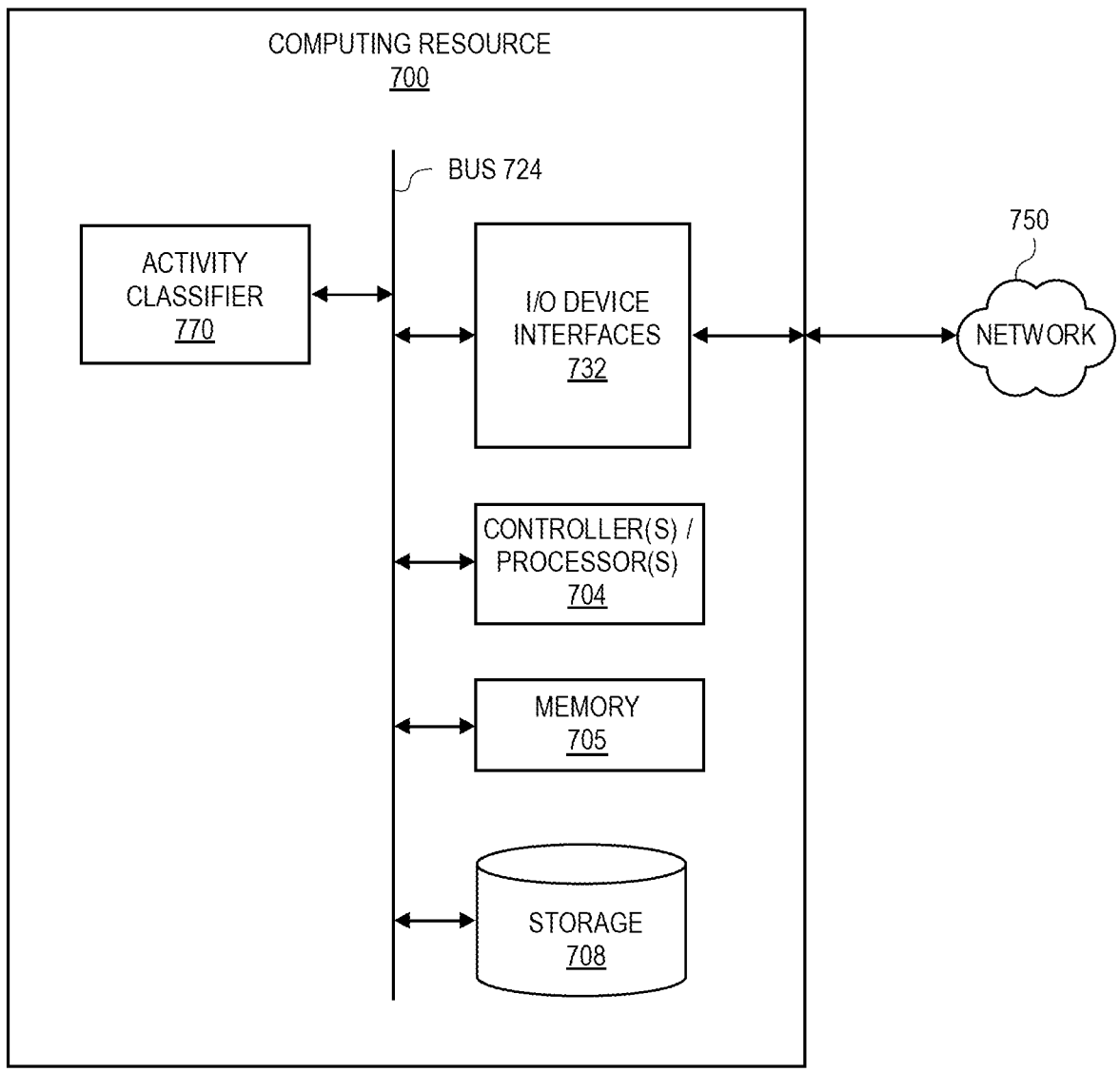
FIG. 7 is a block diagram illustrating exemplary components of a computing resource, according to exemplary embodiments of the present disclosure.

FIG. 7 is a block diagram conceptually illustrating example components of a remote computing device, such as a computing resource 700 that may be used with the described implementations, according to exemplary embodiments of the present disclosure.

Multiple such computing resources 700 may be included in the system. In operation, each of these devices (or groups of devices) may include computer-readable and computer-executable instructions that reside on computing resource 700, as will be discussed further below.

Computing resource 700 may include one or more controllers/processors 704, that may each include a CPU for processing data and computer-readable instructions, and memory 705 for storing data and instructions. Memory 705 may individually include volatile RAM, non-volatile ROM, non-volatile MRAM, and/or other types of memory. Computing resource 700 may also include a data storage component 708 for storing data, activity data, activity classifications, etc. Each data storage component may individually include one or more non-volatile storage types such as magnetic storage, optical storage, solid-state storage, etc. Computing resource 700 may also be connected to removable or external non-volatile memory and/or storage (such as a removable memory card, memory key drive, networked storage, etc.) through input/output device interface 732.

Computer instructions for operating computing resource 700 and its various components may be executed by the controller(s)/processor(s) 704, using memory 705 as temporary "working" storage at runtime. The computer instructions may be stored in a non-transitory manner in non-volatile memory 705, storage 708, or an external device(s). Alternatively, some or all of the executable instructions may be embedded in hardware or firmware on the server in addition to or instead of software.

Computing resource 700 also includes input/output device interface 732. A variety of components may be connected through input/output device interface 732. Additionally, computing resource 700 may include address/data bus 724 for conveying data among components of computing resource 700. Each component within computing resource 700 may also be directly connected to other components in addition to (or instead of) being connected to other components across bus 724.

Each computing resource 700 may also include one or more activity classifiers 770. As discussed above, activity classifiers 770 may be trained in an unsupervised manner to predict an activity classification based on.

The components of computing resource 700, as illustrated in FIG. 7, are exemplary, and may be located as a stand-alone device or may be included, in whole or in part, as a component of a larger device or system.

The disclosed implementations discussed herein may be performed on one or more wearable devices, which may or may not include one or more sensors that generate time-series data, may be performed on a computing resource, such as computing resource 700 discussed with respect to FIG. 7, or performed on a combination of one or more wearable devices and a computing resource (e.g., mobile phone, smartphone, tablet, etc.).

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Persons having ordinary skill in the field of computers, communications, etc., should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented in firmware or hardware.

Moreover, with respect to the one or more methods or processes of the present disclosure shown or described herein, including but not limited to the flow charts shown in FIGS. 3 and 4, orders in which such methods or processes are presented are not intended to be construed as any limitation on the claims, and any number of the method or process steps or boxes described herein can be combined in any order and/or in parallel to implement the methods or processes described herein. In addition, some process steps or boxes may be optional. Also, the drawings herein are not drawn to scale.

The elements of a method, process, or algorithm described in connection with the implementations disclosed herein can also be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor, such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be any of X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
   receiving, substantially simultaneously:
      first motion information captured by a first motion sensor positioned at a source body location; and
      second motion information captured by a second motion sensor positioned at a target body location;
   obtaining a source machine learning system trained to:
      generate source embeddings representative of motion measured at the source body location; and
      determine, based at least in part on the source embeddings, an activity classification for the motion measured at the source body location;
   providing the first motion information to the source machine learning system to generate a source embedding representative of the first motion information captured by the first motion sensor; and
   training a target machine learning system to reconstruct the source embedding for the second motion information.

2. The computer-implemented method of claim 1, wherein the target machine learning system is trained without any labeled training data.

3. The computer-implemented method of claim 1, wherein:
   the source machine learning system includes a source embedding generator and a source classifier, wherein the source embedding generator is configured to generate the source embeddings and the source classifier is configured to apply a plurality of source weights to the source embeddings generated by the source embedding generator to generate source activity predictions; and
   the target machine learning system includes a target embedding generator and a target classifier, wherein the target embedding generator is configured to generate target embeddings associated with motion measured at the target body location; and
   the computer-implemented method further comprises:
      adopting the source weights for the target classifier, so that the source weights are applied to the target embeddings to generate target activity predictions.

4. The computer-implemented method of claim 1, wherein:
   the source machine learning system includes a source embedding generator and a source classifier, wherein the source embedding generator is configured to generate the source embeddings and the source classifier is configured to apply a plurality of source weights to the source embeddings generated by the source embedding generator to generate source activity predictions;

the target machine learning system includes a target embedding generator and a target classifier, wherein the target embedding generator is configured to generate target embeddings associated with motion measured at the target body location; and training the target machine learning system includes training the target classifier using labeled training data for the target body location.

5. A computing system, comprising:

one or more processors; and a memory storing program instructions that, when executed by the one or more processors, cause the one or more processors to at least:

receive, at a first time, first motion information measured at a first location and second motion information measured at a second location;

receive a first embedding representative of the first motion information from a trained first activity classifier; and train a second activity classifier to generate a second embedding for the second motion information that is a reconstruction of the first embedding.

6. The computing system of claim 5, wherein the second activity classifier is trained without labeled training data.

7. The computing system of claim 5, wherein the first location includes a wrist of a user.

8. The computing system of claim 5, wherein the second location includes at least one of:

a chest of a user;
a collar bone area of the user;
an upper arm of the user;
a hip of the user;
an upper leg of the user; or
an ankle of the user.

9. The computing system of claim 5, wherein the program instructions that, when executed by the one or more processors, further cause the one or more processors to at least:

configure the second activity classifier to apply a plurality of weights determined by the trained first activity classifier in determining a predicted activity classification based on motion measured at the second location.

10. The computing system of claim 9, wherein the plurality of weights are applied to embeddings generated by the second activity classifier in determining the predicted activity classification.

11. The computing system of claim 5, wherein training the second activity classifier further includes:

training the second activity classifier using a plurality of labeled training data to learn a plurality of weights that are applied by the second activity classifier in determining a predicted activity classification based on motion measured at the second location.

12. The computing system of claim 11, wherein the plurality of weights are applied to embeddings generated by the second activity classifier in determining the predicted activity classification.

13. The computing system of claim 5, wherein training the second activity classifier includes, in reconstructing the first embedding, applying a loss function including at least one of:

a mean absolute error loss term;
a mean squared error loss term; or
a mean squared logarithmic error loss term.

14. The computing system of claim 5, wherein the program instructions that, when executed by the one or more processors, further cause the one or more processors to at least:

receive third motion information measured at the second location;

provide the third motion information to the trained second activity classifier; and determine, using the trained second activity classifier and based at least in part on the third motion information, a predicted activity classification corresponding to the third motion information.

15. A system, comprising:

a wearable device configured to be worn at a target location of a user; and a trained target activity classifier, wherein the trained target activity classifier is trained according to a method, including steps of at least:

simultaneously obtaining source motion information measured at a source location and target motion information measured at the target location;

obtaining a source embedding representative of the source motion information from a trained source activity classifier; and training the target activity classifier to reconstruct the source embedding for the target motion information.

16. The system of claim 15, wherein the method further includes at least:

configuring the trained target activity classifier to apply a plurality of weights determined by the trained source activity classifier in determining a predicted activity classification based on motion measured at the target location.

17. The system of claim 15, wherein training the target activity classifier further includes:

training the target activity classifier using a plurality of labeled training data to learn a plurality of weights that are applied by the target activity classifier in determining a predicted activity classification based on motion measured at the target location.

18. The system of claim 15, wherein the target activity classifier is trained in an unsupervised manner without labeled training data.

19. The system of claim 15, wherein the trained source activity classifier is associated with a second wearable device configured to be worn at the source location of the user.

20. The system of claim 15, wherein:

the source location includes a wrist of a user; and
the target location includes at least one of:

a chest of a user;
a collar bone area of the user;
an upper arm of the user;
a hip of the user;
an upper leg of the user; or
an ankle of the user.

* * * * *